Patented Mar. 21, 1972

3,651,115
ORGANO-SILICON-CONTAINING ALPHA-PHENYL-BETA-HYDROXY-CARBOXYLIC ACIDS

Igal Belsky, Ramat-Gan, and David Gertner and Albert Zilkha, Jerusalem, Israel, assignors to Yissum Research Development Company, Hebrew University, Jerusalem, Israel
No Drawing. Filed May 18, 1967, Ser. No. 639,301
Claims priority, application Israel, May 22, 1966, 25,820
Int. Cl. C07f 7/10
U.S. Cl. 260—448.2 N        10 Claims

ABSTRACT OF THE DISCLOSURE

Compounds of the formula

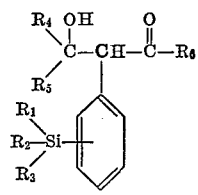

wherein $R_1$, $R_2$, and $R_3$ are alkyl or aryl; $R_4$ and $R_5$ are hydrogen, alkyl, aryl or aralkyl, or form together with the adjoining carbon atom carrying the hydroxyl group a cyclohexyl, cyclopentyl or cycloheptyl group; and $R_6$ is hydroxyl, a residue of an alcohol connected through its hydroxyl group to the carbonyl group by an ester linkage and containing a tertiary amino group and having an alkyl or cycloalkyl or heterocyclic or a condensed biheterocyclic skeleton, or is a residue of any of ammonia, hydroxylamine, hydrazine, N-alkyl or aryl substituted hydrazine, a primary of secondary amine, urea, thiourea of guanidine or their substituted derivatives, all of such residues being connected through nitrogen to the C=O group. The compounds display anti-cholinergic activity and are antidotal against organo-phosphate poisoning.

---

The present invention relates to novel silicon containing β-hydroxy α-phenyl carboxylic acids. More particularly the invention relates to β-substituted tropic acids containing trialkyl or triaryl silyl groups.

The invention also relates to the amide derivatives of these acids, as well as to their amino-alkyl esters and their water soluble salts.

The compounds of the invention are represented by the general formula:

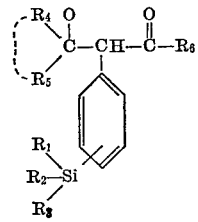

Where the phenyl group is substituted in the ortho, meta or para position by a trisubstituted silyl group ($R_1R_2R_3Si$—)

wherein $R_1$, $R_2$ and $R_3$ represent alkyl or aryl groups same or different having up to 10 C-atoms, $R_4$ and $R_5$ may be the same or different and represent hydrogen, alkyl, substituted alkyl, aryl, substituted aryl, aralkyl and substituted aralkyl groups all having up to 15 C-atoms, cyclohexyl, cyclopentyl and cyclohexenyl groups.

When $R_4$ and $R_5$ are alkyl groups, they may be saturated or unsaturated, straight chained or branched. $R_4$ and $R_5$ also may represent together with the adjoining carbon atom carrying the hydroxyl group, a cyclohexyl, cyclopentyl or cycloheptyl group. $R_6$ is hydroxyl; a residue of an alcohol, connected through its hydroxyl group to the carbonyl group by an ester linkage, containing a tertiary amino group and having an alkyl, cycloalkyl, heterocyclic or a condensed biheterocyclic skeleton; $R_6$ may also be a residue of ammonia, hydroxylamine, hydrozine or N-alkyl or aryl substituted hydrazine or a primary or a secondary amine whether substituted or unsubstituted, aliphatic, aromatic or heterocyclic, or the residue of urea, thiourea or guanidine or their substituted derivatives, all said residues being connected through nitrogen to the C=O group.

The invention also relates to the preparation of O-acyl and acid halide derivatives of the silicon containing carboxylic acids which serve as intermediates for the preparation of the amides and the esters of this invention. They are represented by the general formula:

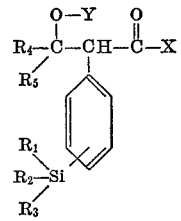

Wherein $R_1$, $R_2$, $R_3$, $R_4$ and $R_5$ are the same as before, X is a halogen atom, Y is an acyl group such as an acetyl or trifluoro acetyl group.

Alkylamine esters of tropic acid, such as the naturally occurring atropine as well as synthetic analogues such as synthropan are medicinally important for their local anaesthetic and mydriatic activity (Barlow, Introduction to Chemical Pharmacology, John Wiley & Sons Co. Ltd., 1955). Alkylamine esters of β-substituted tropic acids have antispasmodic activity (F. Blicke and H. Raffelson, J. Am. Chem. Soc. 74, 1730 (1952). Amides and ureides of substituted benzoic acid, phenylacetic acid, and β-hydroxy phenylpropionic acids are also characterized by physiological activity.

The physiological activity of the new silicon acids, their amide and ester derivatives, is affected by the presence of the bulky trialkylsilyl group. Such a group affects the solubility, partition coefficient, permeability to physiological membranes and the electronic distribution of the molecules and these factors affect the physiological properties of the new compounds.

The new silicon containing tropic acids mentioned in this invention are prepared according to a modification of the Ivanov reaction, starting from the sodium salt of triallylsilyl phenylacetic acid. This salt, when added to an ethereal solution of isopropyl magnesium chloride forms the compound known as Ivanov Reagent (D. Ivanov and A. Spassov, Bull. Soc. Chim. 49, 19 (1931)).

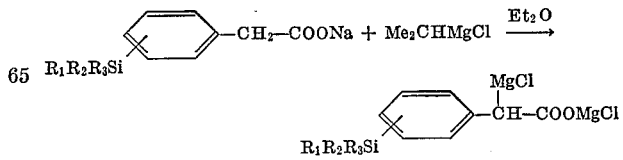

This reagent, when treated with an aldehyde or a ketone, gives, after hydrolysis and purification, the corresponding substituted tropic acid.

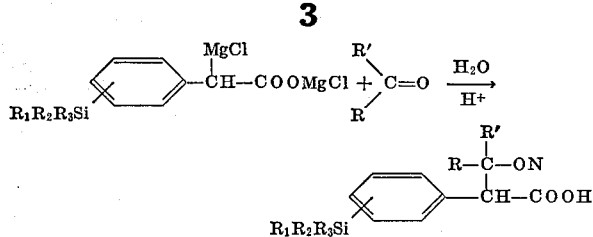

In order to obtain trialkylsilyl tropic acid, gaseous formaldehyde, formed by heating paraformaldehyde at 180°–200° C., is passed through the ethereal solution of the Ivanov reagent.

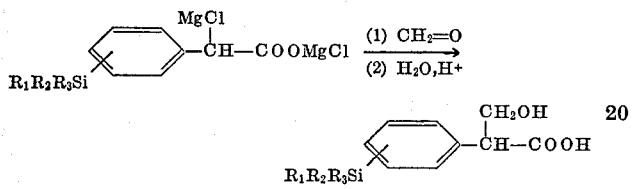

Several methods are possible for the preparation of the alkylamine esters of the trialkylsilyl tropic acid and tri-alkylsilyl β-substituted tropic acids mentioned in this invention. The common method consists of a condensation between the hydroxyl-protected acyl halide of the acid with the appropriate amino alcohol in a suitable solvent such as benzene, chloroform etc. In this method it is essential that the hydroxyl group of the acid will be protected. This is commonly done by acylating the hydroxyl with an acylating agent such as acetyl chloride or acetic anhydride. The acylated acid is now reacted, preferably with thionyl chloride in the presence of anhydrous calcium carbonate to form the corresponding acyl chloride. The O-acyl acid chloride is reacted with amino alcohols such as, for example: tropine, pseudotropine, nortropine, methyl ecgonine to form the acylated ester hydrochloride

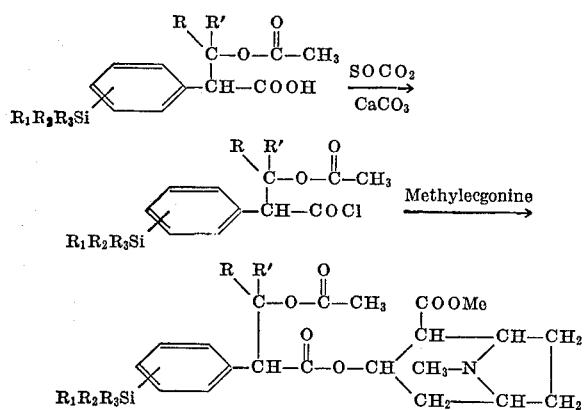

The O-acetyl group is removed by basic or acid hydrolysis to yield the hydroxyl-free ester.

The water soluble salts of these amino esters are prepared by treating the esters in alcohol with organic or inorganic acids such as acetic, citric, malic or lactic acid, hydrochloric or sulfuric acid. These salts may be purified by recrystallization from solvents such as alcohol, ethyl acetate, benzene, isopropanol etc.

Esterification with simple tertiary amino alcohols such as, for example: β-N-diethylamino-ethanol, β-N-dimethyl-amino-ethanol, β-N-dibutyl-amino ethanol, γ-N-dialkyl amino propanol, is obtained by a simpler method. This method consists of reacting equimolar quantities of an acid with the appropriate amino alkyl chloride (obtained by treating the amino-alcohol with thionyl chloride), in boiling isopropanol.

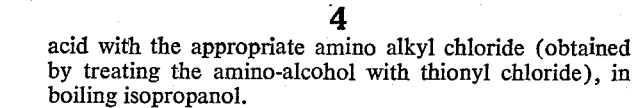

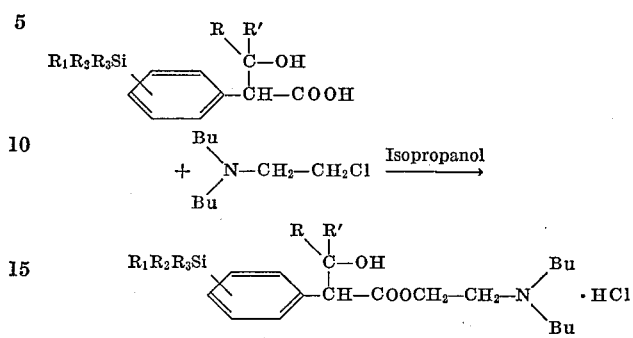

Removal of the isopropanol and trituration with dry ether gives the ester hydrochloride as a white solid, usually in a high degree of purity.

Various methods can be used to prepare the new amide derivatives of the present invention. A convenient method involves formation of the O-acetyl derivatives of the β-hydroxy silicon containing carboxylic acids, converting the derivatives as before, to the acid chlorides and reacting this with a cooled stirred solution of the appropriate amine, using usually two equivalents of the amine, to yield the amide derivative having the O-acetyl group. The acetyl group is then removed by mild hydrolysis. The preparation of such amides may be exemplified schematically by the formation of the N-phenylethyl amide of p-trimethyl-silyl, β,β-dimethyl tropic acid.

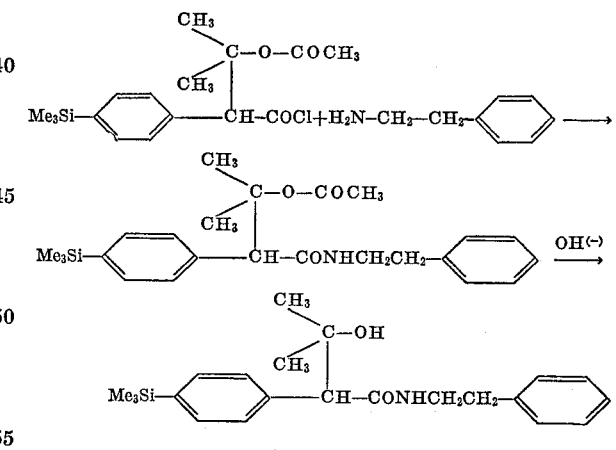

Another useful method for the preparation of the amide derivatives is the reaction of the O-acyl acids with amines in the presence of dicyclohexyl-carbodiimide. This method may be exemplified by the preparation of N-(paratrialkyl-silyl)tropyl alanine ethyl ester:

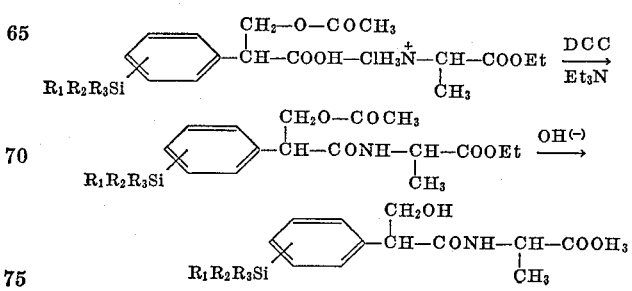

The amide derivatives of the present invention may be prepared from a wide variety of amines. Primary and secondary amines are included. These may also be substituted. As specific examples, allylamine, 1-N-dimethylamino-2-propylamine, p-trimethylsilyl benzylamine, p-triethylsilyl phenylethylamine may be mentioned. Esters of $\alpha$, $\beta$ and $\gamma$ amino-acids are also included. As specific examples may be mentioned, alanine ethyl ester, N-ε-carbobenzoxy-L-lysine ethyl ester, and leucine ethyl ester. Heterocyclic amines such as morpholine, piperidine, N-methylpiperazine, indole, imidazole and pyrole are also included.

The ureide, thioureide and guanidine derivatives of the silicon containing $\beta$-hydroxy-$\alpha$-phenyl carboxylic acids contemplated in the present invention are prepared by treating one equivalent of the O-acyl acid chloride with excess of urea, thiourea, guanidine or their substituted derivatives in a small volume of benzene. After heating the mixture for about two hours on a water bath it is poured into water. The acyl derivatives are purified by washing repeatedly with water and dilute sodium hydroxide. The O-acyl group is removed by mild hydrolysis.

The new silicon containing $\beta$-hydroxy-$\alpha$-phenyl carboxylic acids, their amide and amino ester derivatives show biological activity.

Specific embodiments of this invention are described in the following examples. These, however, are merely illustrative and should not be considered as implying any limitations of the scope of this invention.

EXAMPLE 1

Sodium p-trimethylsilylphenyl acetate

To a solution of sodium metal (2.3 g., 0.1 mole) in absolute ethanol (60 ml.) a solution of p-trimethylsilylphenyl acetic acid (20.8 g., 0.1 mole) in absolute ethanol (40 ml.) was dropped in with stirring. The mixture became neutral on stirring for about 10 min. It was well cooled left for some hours in the cold, filtered, and the sodium salt was dried first in a vacuum desiccator and then at 120°; yield 20.5 g. (89%). An additional crop of impure salt (2.5 g., 11%) can be obtained on evaporating the mother liquor.

*Analysis.*—Calcd. for $C_{11}H_{15}O_2SiNa$ (percent): Si, 12.2 (M.W. 230). Found (percent): Si, 12.5 (M.W. 231 on titration with 0.1 N aqueous hydrochloric acid using methyl orange as indicator).

EXAMPLE 2

$\alpha$-(p-Trimethylsilyl)phenyl, $\beta$-hydroxy-propionic acid (p-trimethylsilyl)-tropic acid To magnesium turnings (2.4 g., 0.1 mole) covered with dry ether, a crystal of iodine was added and isopropyl chloride (2 ml.) was dropped in with stirring. The reaction mixture was heated until reaction set in. The external heating was discontinued and isopropyl chloride (8 g., 0.1 mole) was dropped into the reaction mixture at a rate that caused the mixture to boil gently (about 45 min.). Sodium (p-trimethylsilyl) phenylacetate (11.5 g., 0.05 mole) was added in small portions and the reaction mixture was refluxed gently for 4 hr. The reaction mixture was cooled and dry formaldehyde gas (which was generated from dry para-formaldehyde (10 g.) by heating at 180–200°) was introduced into the reaction mixture by a stream of dry nitrogen during 1 hr. Dry ether was added from time to time to replace the ether which had evaporated. The reaction mixture was efficiently cooled in an ice-salt bath and water (25 ml.) was dropped in followed by hydrochloric acid (30 ml. acid in 60 ml. water). The mixture was stirred for 1 hr. and separated. The aqueous layer was extracted twice with ether (60 ml.). The combined ethereal solutions were dried over magnesium sulfate and the ether was removed in vacuo. Petroleum ether (25 ml.) was added to the viscous residue and the $\alpha$-(p-trimethylsilyl) phenyl, $\beta$-hydroxy propionic acid was left to crystallize out in the refrigerator, filtered and washed with petroleum ether, yield 7.7 g. (64%), M.P. 140° C. on recrystallization from benzene-petroleum ether.

*Analysis.*—Calcd. for $C_{12}H_{18}O_3Si$ (percent): C, 60.5; H, 7.6 (M.W. 238). Found (percent): C, 603; H, 7.5 (M.W. 237). (As determined by titration with 0.1 N potassium methoxide in benzene-methanol solution.)

EXAMPLE 3

$\alpha$ - (p-Trimethylsilyl)phenyl - $\beta$ - hydroxy - $\beta,\beta$ - dimethylpropionic acid ($\beta,\beta$ - dimethyl p-trimethylsilyltropic acid)

Isopropyl chloride (1 ml.) was dropped in with stirring to a mixture of magnesium turnings (2.4 g., 0.1 mole) and a crystal of iodine in dry ether (50 ml.). The mixture was heated until reaction set in. The external heating was stopped and isopropyl chloride (8 g., 0.1 mole) in absolute ether (40 ml.) was dropped in at such a rate that the reaction mixture boiled gently. Sodium p-trimethylsilylphenyl acetate (11.5 g., 0.05 mole) was added in small portions. The mixture was refluxed for 5 hr., cooled in an ice-bath, and acetone (5.8 g., 0.1 mole) (dried over calcium chloride and distilled) in dry ether (30 ml.) was added dropwise. The mixture was refluxed for 2 hours more, cooled in an ice-bath and water (25 ml.) was added dropwise followed by hydrochloric acid 1:1 (50 ml.). The two layers formed were separated and the aqueous layer was extracted with ether. The ether layer was extracted with 2% sodium hydroxide solution. The alkaline extract was acidified, and the $\alpha$-(p-trimethylsilyl) phenyl-$\beta$-hydroxy-$\beta,\beta$-dimethylpropionic acid was taken up in ether, dried over magnesium sulfate and evaporated, leaving the pure acid; yield (11.3 g., 85%), M.P. 157° on recrystallization from benzene-petroleum ether.

*Analysis.*—Calcd. for $C_{14}H_{22}O_3Si$ (percent): C, 63.2; H, 8.3 (M.W. 266). Found (percent): C, 63.2; H, 8.1 (M.W. 266). (Titration with 0.1 N potassium methoxide in absolute ethanol using phenol phthalein as indicator.)

EXAMPLE 4

$\alpha$ - (p - Trimethylsilyl)phenyl - $\beta$ - hydroxy - $\beta$ - phenyl propionic acid ($\beta$ - phenyl - (p - trimethylsilyl) - tropic acid)

The acid was synthesized in 64% yield starting from benzaldehyde by the procedure given in Example 3, M.P. 184° on recrystallization from benzene-petroleum ether.

*Analysis.*—Calcd. for $C_{18}H_{22}O_3Si$ (percent): C, 68.8; H, 7.0 (M.W. 314). Found (percent): C, 69.2; H, 6.9 (M.W. 313).

EXAMPLE 5

$\alpha$-(p-Trimethylsilyl)phenyl-$\alpha$-1-cyclohexanol-acetic acid

This acid was synthesized in 90% yield starting from cyclohexanone by the procedure given in Example 3, M.P. 185° on recrystallization from benzene-petroleum ether.

*Analysis.*—Calcd. for $C_{17}H_{26}O_3Si$ (percent): C, 66.7; H, 8.4 (M.W. 306). Found (percent): C, 66.7; H, 8.1 (M.W. 305).

EXAMPLE 6

$\alpha$-(p-Trimethylsilyl)phenyl-$\alpha$-1-cyclopentanol-acetic acid

The acid was synthesized as in Example 3, in 80% yield, starting from cyclopentanone; M.P. 148° C. on recrystallization from benzene-petroleum ether.

*Analysis.*—Calcd. for $C_{16}H_{24}O_3Si$ (percent): C, 65.8; H, 8.2 (M.W. 292). Found (percent): C, 66.0; H, 8.1 (M.W. 292).

EXAMPLE 7

α-(p-Trimethylsilyl)phenyl-β-hydroxy-β-3,4-dioxymethylene phenyl-propionic acid

The acid was prepared in 90% yield starting from piperonal; M.P. of the crude derivative about 175°.

EXAMPLE 8

α - (m - Trimethylsilyl)phenyl - β - hydroxy - β - phenyl β - methyl propionic acid (m - trimethylsilyl - β - phenyl β-methyl tropic acid)

The acid was synthesized by reaction of sodium salt of m-trimethylsilylphenyl acetic acid and acetophenone by the procedure described in Example 3. Yield 78%; M.P. 136° C., on recrystallization from benzene-petroleum ether.

*Analysis.*—Calcd. for $C_{19}H_{24}O_3Si$ (percent): M.W. 328. Found (percent): MW. 327.

EXAMPLE 9

O-acetyl, p-trimethylsilyl tropic acid

Acetyl chloride (10 ml., excess) was added to a solution of p-trimethylsilyl tropic acid (2.4 g.; 0.01 mole) in benzene (10 ml.) and heated under gentle reflux for 2 hr. Excess acetyl chloride was driven off in vacuo, water was added, the mixture was stirred for some time and taken up in ether, dried, and evaporated in vacuo. The viscous oil solidified on standing for several days under petroleum ether; yield 2.4 g. (85%). The O-acetyl, p-trimethylsilyl tropic acid had an M.P. of 118° C. on recrystallization from benzene petrol ether.

*Analysis.*—Calcd. for $C_{14}H_{20}O_4Si$ (percent): C, 60.0; H, 7.1. Found (percent): C, 60.0; H, 7.3.

EXAMPLE 10

α-(p-Trimethylsilyl) phenyl-β-acetoxy,β,β-dimethyl propionic acid

To a solution of α - (p - trimethylsilyl)phenyl,,β-hydroxy,β,β-dimethyl propionic acid (5.32 g.; 0.02 mole) in dry benzene (60 ml.) powdered calcium carbonate (10 g.; excess) wts added.

Acetyl chloride (7.85 g.; 0.1 mole) was dropped in slowly with stirring. The reaction mixture was stirred for 12 hr. filtered and the excess acetyl chloride and benzene were driven off in vacuo. The residual oil crystallized out on standing for several days. The α-(p-trimethylsilyl)phenyl,β-acetoxy,β,β-dimethyl, propionic acid was recrystallized from benzene-petroleum ether; yield 3.5 g. (58%); M.P. 113°.

*Analysis.*—Calcd. for $C_{16}H_{24}O_4Si$ (percent): C, 62.3; H, 7.8. Found (percent): C, 62.4; H, 7.6.

EXAMPLE 11

γ(p-Trimethylsilyl)phenyl,β-hydroxy,β,β-dimethyl propionamide

Thionyl chloride (5 ml.; excess) was dropped into a solution of O-acetyl,β,β-dimethyl p-trimethylsilyl tropic acid (1 g., 0.0032 mole) and heated to gentle reflux for 2 hr. Excess thionylchloride and benzene were removed in vacuo. The residue was taken up in dry dioxane (5 ml.) and added dropwise with stirring into cold concentrated ammonia solution. The mixture was stirred for 30 min., filtered and washed with water. The acetyl groups were removed by hydrolysis with alkali in aqueous ethanol at room temperature. The reaction mixture was neutralized with hydrochloric acid, the alcohol was removed in vacuo and the amide was filtered, washed with water followed by 5% sodium carbonate solution. The α - (p - trimethylsilyl) - phenyl - β - hydroxy-β,p-dimethyl propionamide was crystallized from ethanol-water in 83% yield; M.P. 105° C.

*Analysis.*—Calcd. for $C_{14}H_{23}NO_2Si$ (percent): N, 5.3. Found (percent): N, 5.2.

EXAMPLE 12

O1acetyl-(p-trimethylsilyl) tropyl-p-chloro anilide

To a solution of O-acetyl-(p-trimethylsilyl)-tropic acid (0.7 g.; $2.5 \cdot 10^{-3}$ mole) and p-chloro aniline (0.32 g.; $2.5 \cdot 10^{-3}$ mole) in methylene chloride, dicyclohexyl carbodiimide (0.5 g.; $2.5 \cdot 10^{-3}$ mole) was added and stirred for 30 min. Acetic acid (several drops) was added and the reaction mixture stirred for another 30 min., thereafter filtered and the filtrate was washed with 5% hydrochloric acid, dilute sodium carbonate solution, followed by water and dried over magnesium sulfate. The methylene chloride was driven off in vacuo and the residue taken up in benzene. Traces of dicyclohexyl urea were filtered off and the benzene solution evaporated in vacuo. Petroleum ether was added to the residual oil which crystallized out to yield 0.95 g. (96%) of the p-chloro anilide, M.P. 113° C.

*Analysis.*—Calcd. for $C_{20}H_{24}O_3NSiCl$ (percent): N, 3.6. Found (percent): N, 3.9.

EXAMPLE 13

N-(O-acetyl-p-trimethylsilyl-tropyl) DL-alanine ethyl ester

The compound was obtained by the reaction of (O-acetyl-p-trimethylsilyl)-tropic acid with DL-alanine ethyl ester hydrochloride in the presence of one equivalent of triethyl amine and dicyclohexyl carbodiimide in 85% yield, as described in Example 12. The N-(O-acetyl-p-trimethylsilyl-tropyl) - DL - alanine ethyl ester melts at 100° C.

*Analysis.*—Calcd. for $C_{19}H_{29}NO_5Si$ (percent): N, 3.7. Found (percent): N,

EXAMPLE 14

O-acetyl-(p-trimethylsilyl)-tropyl amide

Into a solution of O-acetyl - (p - trimethylsilyl)-tropic acid (2.8 g.; 0.01 mole) in dry benzene (15 ml.) and anhydrous powdered calcium carbonate thionyl chloride (10 ml.; excess) was added dropwise and the reaction mixture heated to reflux for 2 hr. The reaction mixture was filtered and the residue washed thoroughly with dry benzene. The combined filtrates were evaporated in vacuo. To the residue benzene was added and the solution was evaporated again in vacuo to remove traces of thionyl chloride and leave behind O-acetyl-(p-trimethylsilyl)-tropyl chloride. One quarter of this acid chloride was dissolved in dioxane (few ml.) and dropped into cold concentrated ammonia solution and stirred for 10 min. in the cold. The O - acetyl - (p-trimethylsilyl) - tropyl amide (0.6 g.; 86%) was filtered, washed and recrystallized from aqueous ethanol; M.P. 143° C.

*Analysis.*—Calcd. for $C_{14}H_{21}NO_3Si$ (percent): N, 5.0. Found (percent): N, 4.7.

EXAMPLE 15

O-acetyl-(p-trimethylsilyl)-tropyl morpholide

To a solution of morpholine (0.5 g.; $5.7 \cdot 10^{-3}$ mole) in chloroform (10 ml.), a solution of O-acetyl-(p-trimethylsilyl)-tropyl chloride (prepared as in Example 14 from 0.7 g. acid) in chloroform (10 ml.) was dropped in and stirred for 8 hr. The reaction mixture was filtered and the chloroform was driven off in vacuo. The residue was taken up in ether and the solution washed with 5% hydrochloric acid, 5% potassium carbonate and water, dried, and evaporated in vacuo. The O-acetyl-(p-trimethylsilyl)-tropyl morpholide which remained as an oil solidified in the cold.

*Analysis.*—Calcd. for $C_{18}H_{27}NO_4Si$ (percent): N, 4.0. Found (percent): N, 3.9.

EXAMPLE 16

O-acetyl-(p-trimethylsilyl)-tropyl-allyl amide

The compound was prepared by the same procedure given in Example 15 on reaction with allyl amine.

*Analysis.*—Calcd. for $C_{17}H_{25}NO_3S$ (percent): N, 4.4. Found (percent): N, 4.1.

EXAMPLE 17

O-acetyl-(p-trimethylsilyl)-atropine

Into a solution of O-acetyl-(p-trimethylsilyl)-tropic acid (1.4 g.; 0.005 mole) in benzene (5 ml.) and powdered calcium carbonate (5 g.) thionyl chloride (5 ml.; excess) was dropped in and the mixture was heated to gentle reflux for 2 hr. The reaction mixture was filtered and the residue was washed with benzene. The benzene and excess thionyl chloride were evaporated in vacuo, benzene (20 ml.) was added and the solution evaporated again, to remove traces of thionyl chloride. The residue was taken up in dry benzene (15 ml.) and dropped into a solution of tropine (2.82 g.; 0.02 mole) in dry benzene (30 ml.). The reaction mixture was heated with stirring for 3 hr., evaporated in vacuo, and water (100 ml.) was added to the residue. Sodium hydroxide solution (5%) was added to pH 14 and the ester was extracted with ether. The ethereal extract was washed with water, dried over $MgSO_4$, and filtered. Dry gaseous hydrogen chloride was bubbled through the ethereal solution for 5 min., petroleum ether was added to turbidity and left to crystallize in the cold. The O-acetyl-(p-trimethylsilyl)-atropine hydrochloride (1.6 g.; 73%) was filtered; M.P. 168–170° C.

*Analysis.*—Calcd. for $C_{22}H_{34}NO_4SiCl$ (percent): N, 3.2. Found (percent): N, 2.8.

The structure of p-trimethylsilyl atropine hydrochloride is:

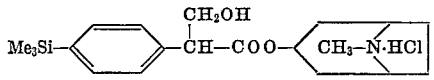

EXAMPLE 18

O-acetyl-(p-trimethylsilyl)-tropyl urea

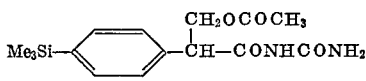

To a solution of O-acetyl-(p-trimethylsilyl)-tropyl chloride (0.75 g.; 0.0025 mole) in benzene (5 ml.), powdered urea (0.5 g.; 0.008 mole) was added and the mixture was heated slowly until reaction set in. The mixture was then gently refluxed for 1 hr. The benzene was driven off in vacuo, water was added to dissolve excess urea and the mixture filtered. The residue was washed with dilute sodium carbonate solution followed by water and dried to yield 0.6 g. (75%) of O-acetyl-(p-trimethylsilyl)-tropyl urea.

*Analysis.*—Calcd. for $C_{15}H_{22}N_2O_4Si$ (percent): N, 8.7. Found (percent): N, 8.2.

EXAMPLE 19

β-Diethylaminoethyl-α-(p-trimethylsilyl)phenyl-β-hydroxy propionate hydrochloride

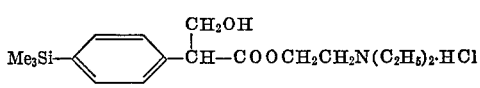

β-Diethylaminoethyl chloride (1.35 g.; 0.01 mole) was added to a solution of α-(p-trimethylsilyl) phenyl-β-hydroxy propionic acid (2.38 g.; 0.01 mole) in dry isopropanol (14 ml.) and heated to reflux for 10 hr. The reaction mixture was filtered and evaporated in vacuo. Dry ether was added to the residual viscous oil and left in the refrigerator overnight. The product (3 g.; 82%) precipitated out, M.P. (in a closed capillary) 118° C. after recrystallization from ethyl acetate petroleum ether.

*Analysis.*—Calcd. for $C_{18}H_{32}O_3SiCl$ (percent): C, 57.8; H, 8.6; N, 3.7. Found (percent): C, 57.4; H, 8.8; N, 4.0.

EXAMPLE 20

β-Diethylaminoethyl ester of α-(p-trimethylsilyl)phenyl-β-hydroxy-β,β-dimethyl propionic acid hydrochloride

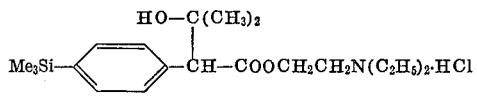

This compound was prepared from α-(p-trimethylsilyl) phenyl-hydroxy-β,β-dimethyl propionic acid by the procedure given in Example 19 in 87% yield; M.P. 145–147° C. on recrystallization from ethylacetate-petroleum ether.

*Analysis.*—Calcd for $C_{20}H_{36}O_3NSiCl$ (percent): C, 59.8; H, 8.9; N, 3.5. Found (percent): C, 59.9; H, 8.7; N, 3.8.

EXAMPLE 21

β-Dimethylaminoethyl ester of α-(p-trimethylsilyl)phenyl-β-hydroxy-β,β-dimethyl propionic acid hydrochloride

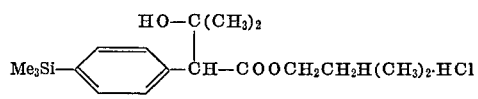

This ester hydrochloride was prepared from β-dimethylaminoethyl chloride and the corresponding acid by the procedure given in Example 19 in 84% yield. M.P. 153–155° C.

*Analysis.*—Calcd. for $C_{18}H_{32}NO_3Cl$ (percent): N, 3.8. Found (percent): N, 4.0.

EXAMPLE 22

β-Dimethylaminoethyl ester of α-(p-trimethylsilyl)phenyl-α-1-cyclopentanol acetic acid hydrochloride

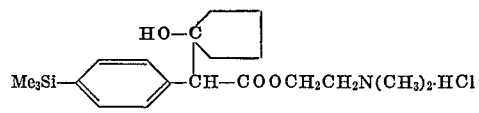

This compound was synthesized in 90% yield by the procedure given in Example 19, from β-dimethylaminoethyl chloride and the corresponding acid. M.P. 139–141° C. on recrystallization from ethylacetate-petroleum ether.

*Analysis.*—Calcd. for $C_{20}H_{34}NO_3SiCl$ (percent): C, 60.1, 8.5; N, 3.5. Found (percent): C, 59.9; H, 8.5; N, 3.2.

EXAMPLE 23

β-Dimethylaminoethyl ester of α-(p-trimethylsilyl)phenyl-α-1-cyclohexanol acetic acid hydrochloride

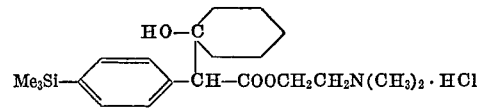

The compound was prepared in 87% yield starting from β-dimethylaminoethyl chloride and the corresponding silicon containing carboxylic acid, by the procedure given in Example 19. Melting point 150–152° C. on recrystallization from ethylacetate-petroleum ether.

*Analysis.*—Calcd. for $C_{21}H_{36}NO_3SiCl$ (percent): N, 3.4. Found (percent): N, 3.4.

EXAMPLE 24

Anti-cholinergic activity of (1) BYT 119-β-dimethylaminoethyl ester of α-(p-trimethylsilyl)phenyl-β-hydroxy-β,β-dimethyl propionic acid hydrochloride.

(2) BYT 120-β-diethylaminoethyl-α-(p-trimethylsilyl)phenyl-β-hydroxypropionate hydrochloride.

(3) BYT 1110-β-dimethylaminoethyl ester of α-(p-trimethylsilyl)phenyl-α-1-cyclohexanol acetic acid hydrochloride.

(4) BYT 1100-β-dimethylaminoethyl ester of α-(p-trimethylsilyl)phenyl-β-hydroxy-β,β-dimethyl propionic acid hydrochloride.

(5) BYT 1120-β-dimethylaminoethyl ester of α-(p-trimethylsilyl)phenyl-α-1-cyclopentanol acetic acid hydrochloride.

MATERIALS

All substances were supplied in crystalline state. For purposes of dose calculations they were considered to be 100% pure.

METHODS

Solvent: All experimental compounds were dissolved in saline. Regardless of route of administration, maximal volume administered to mice never exceeded 0.2 ml./20 g.

Reference Drug: Atropine used as reference drug was the sulphate salt.

(1) Dose range finding experiments and gross behavioural changes in mice

Experimental compounds were administered intraperitoneally to groups of 5 animals for each dose lever. Mortality and changes in gross behaviour were noted. Observations were made for not more than 24 hours following injection.

(2) In vitro antagonism to acetylcholine

This test was conducted on the isolated guinea-pig ileum. The organ was suspended in a 5 ml. bath of Tyrode solution at 35° C. Antagonism of acetylcholine induced contractions were noted. Histamine and bradykinin were used to ascertain the specificity of acetylcholine antagonism.

(3) In vivo antagonism to hypotension elicited by acetylcholine and effects on blood pressure, respiration rate and heart rate Male cats (2–3 kg. body weight), anaesthetized with Nembutal 35 mg./kg. intraperitoneally, were used. Blood pressure was measured from the left carotid artery with an Hg-manometer or a Statham pressure transducer and recorded on a kymograph or physiograph, respectively. Respiration rate and heart rate were recorded on the physiography with impedance electrodes and ECG transducer, respectively. Time was also recorded. Substances were injected through a cannula in the left femoral vein.

The experimental compounds were assayed against the hypotension reduced by acetylcholine, administered at doses of up to 10 mg.

(4) Anti-arecoline test-mice (Herz, A. 1962. Arch exp. Path. Pharmak. 242:414)

Experimental compounds were injected intraperitoneally to mice, followed 30 minutes later by the subcutaneous administration of arecoline, 4 mg./kg. Ten minutes later a tail clamp was applied and the animals' responsiveness was recorded.

This method is based on the fact that arecoline inhibits the reaction to nociceptive stimulation and that this reaction can be abolished by centrally active atropine-like substances.

(5) Mydriatic action—Mice (Pulewka, P. 1932. Arch exp. Path. Pharmak. 242:307)

Experimental compounds were injected subcutaneously. The diameter of the pupils was measured with a micrometer under a stereoscopic microscope at 15-minute intervals, two times before and four times after injection.

RESULTS (1) Dose range finding experiments and gross behavioural changes—Mice Results are shown in Table 1.

(2) In vitro antagonism to acetylcholine—Guinea-pig ileum

Results are shown in Table 2.

(3) In vivo antagonism to acetylcholine, blood pressure, respiration rate and heart rate Results are shown in Table 3.

(4) Anti-arecoline test—Mice

Results are shown in Table 4.

(5) Mydriatic action—Mice

Results are shown in Table 5.

TABLE 1

Dose Range Finding Experiment and Gross Behavioural Changes
[Groups of 5 mice ♂ of 22–25 g. body weight for each dose level]

| Compound | Dose (mg./kg.) | General changes |
|---|---|---|
| BYT 119 | 25 | No obvious abnormalities. |
| | 50 | Spontaneous motility slightly reduced. Slight piloerection. |
| | 100 | During first ½ hr. slight ataxia, followed by decrease in spontaneous motility. Brief intermittent convulsions. Ptosis. Hypothermia. Symptoms lasting about 3 hours. |
| | 200 | 4 animals died within 60 min. Death was preceded by strong clonic convulsions. |
| BYT 120 | 25 | No obvious abnormalities. |
| | 50 | Spontaneous motility reduced. Piloerection. |
| | 100 | During first ½ hr. ataxia, followed by almost complete cessation of spontaneous activity. Decreased sensibility to touch. Intermittent myoclonic jerks. Hypothermia. Symptoms lasting about 2 hours. |
| | 200 | All the animals died within 15 min. Death was preceded by convulsions. |
| BYT 1100 | 25 | No obvious abnormalities. |
| | 50 | Slight piloerection. Slight ptosis. |
| | 100 | During first ½ hr. clonic convulsions, followed by decreased spontaneous motility. Reduced sensibility to touch. Dyspnea. Symptoms lasting for about 3 hours. |
| | 200 | All animals died within 10 minutes following strong convulsions. |
| BYT 1110 | 2 | No obvious abnormalities. |
| | 50 | Within 5 min. following injection, strong myoclonic jerks and writhing, lasting several minutes. Slight piloerection. |
| | 100 | Slight ptosis. Piloerection. |
| | 200 | Considerable reduction in spontaneous motility. Ptosis. 3 animals died within 18 hours. |
| BYT 1120 | 25 | No obvious abnormalities. |
| | 50 | Piloerection. |
| | 100 | Slight ptosis. Slight decrease in spontaneous motility. During first 15 min. following injection brief strong myoclonic jerks and writhing. |
| | 200 | Ataxia followed by decreased spontaneous activity. Ptosis. Symptoms lasting for about 2 hours. |

TABLE 2

In Vitro Acetylcholine Antagonism—Guinea Pig Ileum

[Figures represent mean values of 3 experiments for each compound]

| Concentration (μg./ml.) | Percent reduction in height of concentration elicited by acetylcholine in presence of experimental compounds | | | | |
|---|---|---|---|---|---|
| | Atropine | BYT 119 | BYT 120 | BYT 1100 | BYT 1110 | BYT 1120 |
| 0.04 | 95 | 70 | | | | |
| 0.1 | 100 | 95 | | | | |
| 0.2 | | 100 | | | 10 | |
| 0.4 | | | | 85 | 85 | 80 |
| 0.6 | | | | | 80 | |
| 1 | | | 70 | 95 | 100 | 90 |
| 2 | | | 70 | 100 | | 100 |

Remark: None of the compounds showed any antagonistic effects towards contractions elicted by histamine or bradykinin.

TABLE 3
Antagonism to Hypotension Elicited by Acetylcholine and Effects on Blood Pressure, Respiration Rate and Heart Rate

[Figures represent mean values obtained from at least three separate experiments]

| Compound | Dose (mg./kg.) | Blood pressure | | Respiration rate | | Heart rate | Antagonism to repressor effect of acetylcholine |
|---|---|---|---|---|---|---|---|
| | | Decrease (mm. Hg) | Duration (min.) | Increase (percent of control) | Duration (min.) | | |
| BYT 119 | 1 | 20 | 1 | 20 | 1 | No effect | None. |
|  | 2 | 50 | 2½ | 35 | 1 | ...do....... | Do. |
|  | 4 | 80 | 4 | 85 | 3 | ...do....... | Do. |
| BYT 120 | 1 | 10 | ½ | 20 | 2 | ...do....... | Do. |
|  | 2 | 50 | 2 | 60 | 2 | ...do....... | Do. |
|  | 4 | 100 | 4 | 65 | 3 | ...do....... | Do. |
| BYT 1100 | 2 | 50 | 2½ | 70 | 2 | ...do....... | Do. |
|  | 4 | 80 | 6 | 75 | 3 | ...do....... | Do. |
| BYT 1110 | 1 | 50 | 2 | 45 | 1½ | ...do....... | Do. |
|  | 2 | 80 | 3 | 50 | 3 | ...do....... | Do. |
|  | 4 | 90 | 8 | 55 | 5 | ...do....... | Do. |
| BYT 1120 | 1 | 40 | 3 | 25 | 2 | ...do....... | Do. |
|  | 2 | 80 | 3 | 30 | 3 | ...do....... | Do. |
|  | 4 | 90 | 6 | 45 | 5 | ...do....... | Do. |

TABLE 4
Anti-Arecoline Test—Mice

[Groups of 8 mice of 20-25 g. body weight for each dose level]

| Compound | Dose (mg./kg.) | Anti-arecoline action,[1] average of 8 mice |
|---|---|---|
| Atropine | 0.5 | ++ |
|  | 1 | ++++ |
|  | 10 | ++++ |
| BYT 119 | 0.5 | 0 |
|  | 1 | + |
|  | 10 | +++ |
| BYT 120 | 0.5 | 0 |
|  | 1 | ++ |
|  | 10 | ++ |
| BYT 1100 | 0.5 | 0 |
|  | 1 | 0 |
|  | 10 | ++ |
| BYT 1110 | 0.5 | 0 |
|  | 1 | ++ |
|  | 10 | ++ |
| BYT 1120 | 0.5 | 0 |
|  | 1 | ++ |
|  | 10 | ++++ |

[1] Rating scale:
0=No anti-arecoline action.
+=Very slight. Turning of head sidewards or backwards. No biting of clamp.
++=Slight. Briefly biting of clamp.
+++=Medium. Intermittent attempt to remove clamp.
++++=Strong. Immediate, strong and continuous attempt to remove clamp.

TABLE 5
Mydriatic Action—Mice

[Groups of 4 mice ♂ of 20-23 g body weight for each dose level]

| Compound | Dose (mg./kg.) | Increase (percent) in pupilary width (average of 4 mice) | | | |
|---|---|---|---|---|---|
| | | 15 min. | 30 min. | 45 min. | 60 min. |
| Atropine | 0.1 | 36 | 150 | 112 | 137 |
|  | 1 | 200 | 200 | 233 | 216 |
| BYT 119 | 0.1 | 14 | 14 | 0 | 0 |
|  | 1 | 14 | 0 | 0 | 0 |
|  | 10 | 25 | 12 | 12 | 0 |
| BYT 120 | 0.1 | 14 | 10 | 0 | 0 |
|  | 1 | 10 | 0 | 0 | 0 |
|  | 10 | 0 | 0 | 0 | 0 |
| BYT 1100 | 0.1 | 0 | 0 | 0 | 0 |
|  | 1 | 0 | 0 | 0 | 0 |
|  | 10 | 0 | 12 | 0 | 0 |
| BYT 1110 | 0.1 | 0 | 0 | 0 | 0 |
|  | 1 | 0 | 28 | 28 | 0 |
|  | 10 | 0 | 20 | 0 | 0 |
| BYT 1120 | 0.1 | 0 | 0 | 0 | 0 |
|  | 1 | 0 | 0 | 0 | 0 |
|  | 10 | 33 | 116 | 12 | 0 |

SUMMARY.—All these compounds show anti-cholinergic action both in isolated gut as well as in intact animals. In the latter, however, the activity varied greatly, according to the animal-test considered.

EXAMPLE 25

Antidotal action against organophosphate poisioning of the compounds BYT 119, BYT 120, BYT 1100, BYT 1110 and BYT 1120.

Test for antidotal action again organophosphate poisoning—mice

Since the combination of atropine and P2S (pyridine-2-aldoxime methane sulphonate) constitute the standard treatment against organic phosphate poisoning, the possibility of replacing atropine by the experimental compounds was considered.

Experimental compounds in combination with a standard dose of P2S (90 mg./kg.) were administered intraperitoneally to mice. 5 minutes later, TEPP (tetraethylpyrophosphate) was injected subcutaneously to these animals and the number of survivors recorded. Observations for mortality were made for not more than 24 hours after the administration of TEPP.

Antidotal action against organophosphate poisoning

Results are shown in Table 6.

TABLE 6
Protective Effects of BYT 119, BYT 120, BYT 1100, BYT 1110 and BYT 1120 Against Organophosphate Poisoning

[The test compounds were injected together with 90 mg./kg. of P2S and 5 minutes before TEPP, into groups of 5 mice per dose level. Mortality was recorded until 24 hours after injection]

| Compound | Dose (mg./kg.) | TEPP (multiples of $LD_{50}$) | Survivors |
|---|---|---|---|
| P2S (Control) | 90 | 5 | 3 |
|  | 90 | 10 | 0 |
| Atropine (Control) | 25 | 5 | 5 |
| Atropine (without P2S) | 25 | 5 | 0 |
| BYT 119 | 50 | 5 | 5 |
|  | 25 | 5 | 5 |
|  | 10 | 5 | 5 |
|  | 50 | 10 | 5 |
|  | 25 | 10 | 5 |
|  | 10 | 10 | 3 |
| BYT 119 without P2S | 50 | 5 | 0 |
| BYT 120 | 50 | 5 | 3 |
| BYT 1100 | 50 | (¹) | 0 |
| BYT 1110 | 50 | 5 | 5 |
|  | 50 | 10 | 2 |
| BYT 1110 without P2S | 50 | 5 | 0 |
| BYT 1120 | 50 | (¹) | 0 |

[1] Animals died within 5 minutes after the combined injection of P2S and the test compound. prior to the injection of TEPP.

Having now particularly described and ascertained the nature of our said invention and in what manner the same is to be performed, we declare that what we claim is:

1. Organo-siliocn compound having the formula:

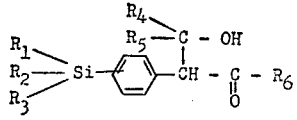

wherein $R_1$, $R_2$ and $R_3$ are each lower alkyl; $R_4$ and $R_5$ are each hydrogen or lower alkyl, or together with the adjoining carbon carrying the hydroxyl form cyclohexyl or cyclopentyl; and $R_6$ is —$CH_2CH_2N(R_7)_2$ wherein $R_7$ is lower alkyl.

2. β-Di-lower alkyl aminoethyl esters of α-(tri-lower alkyl silyl) phenyl-β-hydroxy propionic acid, in accordance with claim 1.

3. β-Diethyl aminoethyl-α-(p-trimethyl-silyl) phenyl-β-hydroxy propionate hydrochloride, in accordance with claim 2.

4. β-Di-lower alkyl aminoethyl esters of α-(tri-lower alkyl silyl) phenyl-α-1-cyclohexanol acetic acid, in accordance with claim 1.

5. β-Dimethyl aminoethyl ester of α-(p-trimethyl silyl) phenyl-α-1-cyclohexanol acetic acid hydrochloride, in accordance with claim 4.

6. β-Di-lower alkyl aminoethyl esters of α-(tri-lower alkyl silyl) phenyl-α-1-cyclopentanol acetic acid, in accordance with claim 1.

7. β-Dimethyl aminoethyl ester of α-(p-trimethyl silyl) phenyl-α-1-cyclopentanol acetic acid hydrochloride, in accordance with claim 6.

8. β-Di-lower alkyl aminoethyl esters of α-(trilower-alkyl silyl) phenyl-β-hydroxy-β,β-dimethyl propionic acid, in accordance with claim 1.

9. β-Diethyl aminoethyl ester of α-(p-trimethyl silyl) phenyl-β-hydroxy-β,β-dimethyl propionic acid hydrochloride, in accordance with claim 8.

10. β-Dimethyl aminoethyl ester of α-(p-trimethyl silyl) phenyl-β-hydroxy-β,β-dimethyl propionic acid hydrochloride, in accordance with claim 8.

References Cited
UNITED STATES PATENTS

| | | | |
|---|---|---|---|
| 3,288,754 | 11/1966 | Green | 260—448.2 B X |
| 3,293,275 | 12/1966 | Pratt | 260—448.2 N |
| 3,505,376 | 4/1970 | Frankel et al. | 260—448.2 N |

TOBIAS E. LEVOW, Primary Examiner

P. F. SHAVER, Assistant Examiner

U.S. Cl. X.R.

260—247 R, 247.7 H, 247.7 D, 292, 448.2 B, 448.2 E; 424—184

UNITED STATES PATENT OFFICE
CERTIFICATE OF CORRECTION

Patent No. 3,651,115      Dated March 21, 1972

Inventor(s) Igal BELSKY et al.

It is certified that error appears in the above-identified patent and that said Letters Patent are hereby corrected as shown below:

Column 1, line 55 (the formula), change 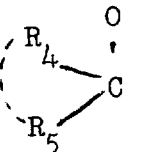

to read 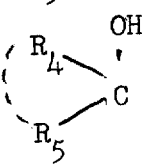

Column 9, line 59, delete "8.2."

Column 10, line 4, delete "$C_{18}H_{32}O_3SiCl$" and insert

-- $C_{18}H_{32}O_3NSiCl$ --

Signed and sealed this 5th day of September 1972.

(SEAL)
Attest:

EDWARD M. FLETCHER, JR.
Attesting Officer

ROBERT GOTTSCHALK
Commissioner of Patents